L. A. DEGGINGER.
CARRIER FOR EGGS, FRUITS, AND THE LIKE.
APPLICATION FILED FEB. 13, 1915.
1,143,593.
Patented June 15, 1915.
2 SHEETS—SHEET 1.
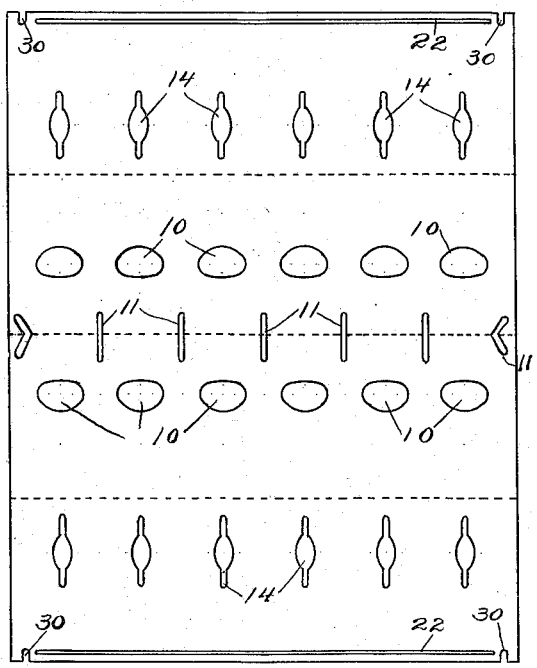
Fig. 1.
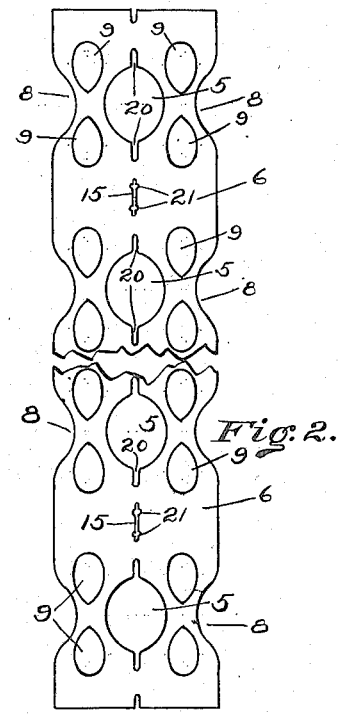
Fig. 2.
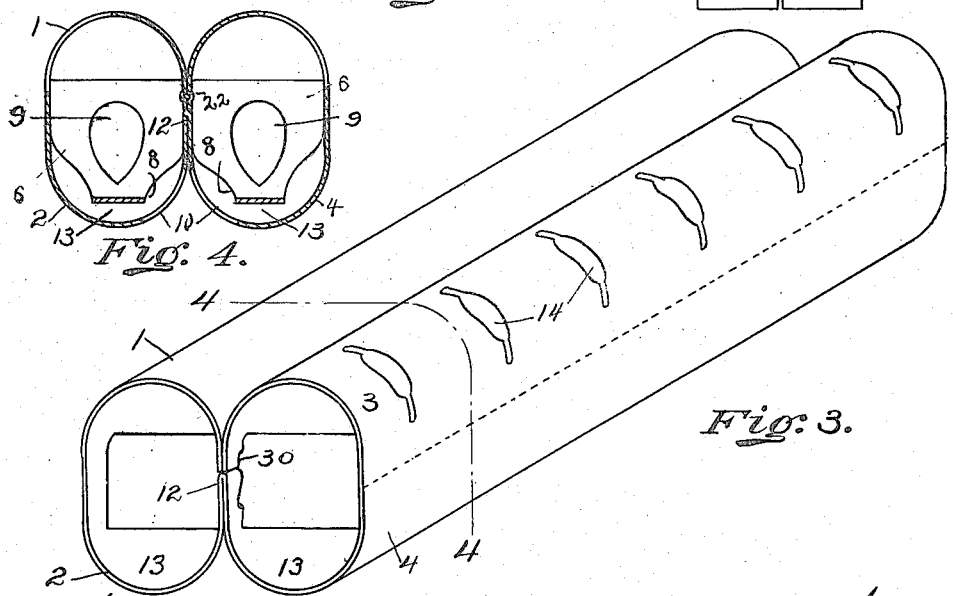
Fig. 4.
Fig. 3.
Witnesses
B. B. Bliss
L. M. Dunlap
Inventor
Louis A. Degginger
by John J. Trebli
Attorney

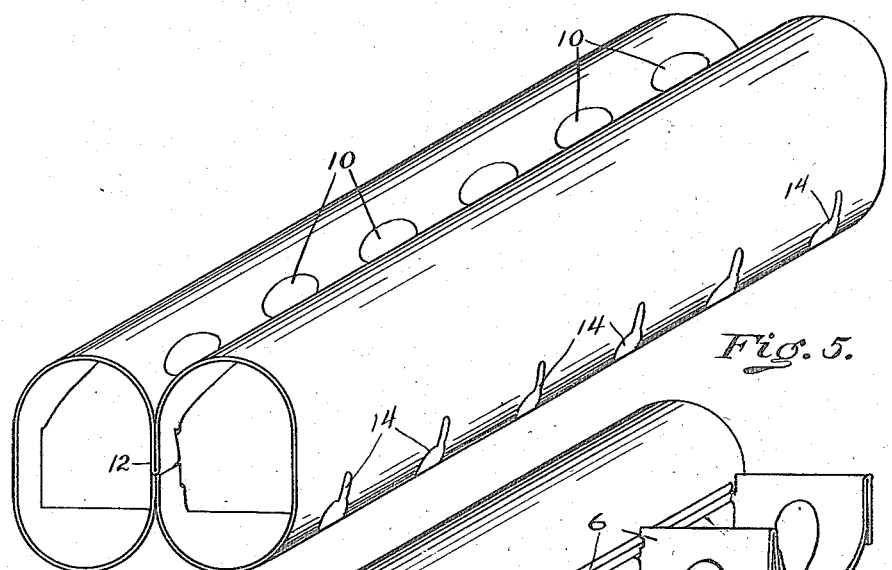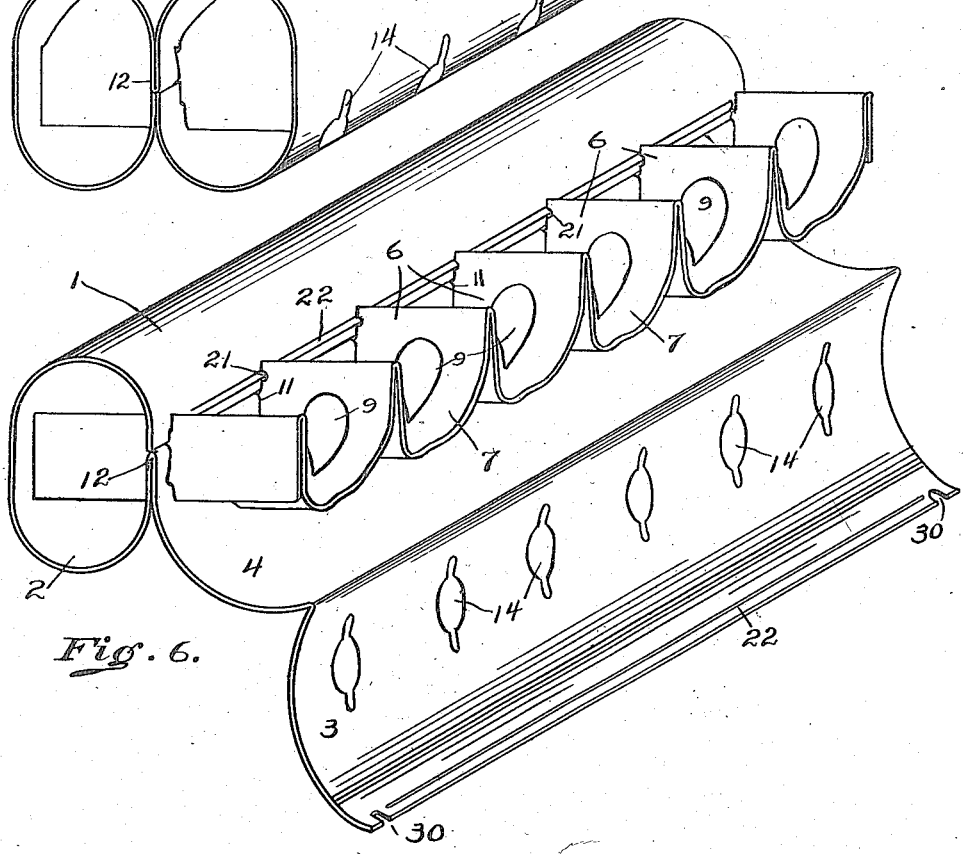

UNITED STATES PATENT OFFICE.

LOUIS A. DEGGINGER, OF COVINGTON, KENTUCKY, ASSIGNOR TO THE NO-BREAK EGG CARRIER COMPANY, OF CINCINNATI, OHIO, A CORPORATION OF OHIO.

CARRIER FOR EGGS, FRUITS, AND THE LIKE.

1,143,593.  Specification of Letters Patent.  Patented June 15, 1915.

Application filed February 13, 1915. Serial No. 8,088.

*To all whom it may concern:*

Be it known that I, LOUIS A. DEGGINGER, a citizen of the United States, residing at the city of Covington, in the county of Kenton and State of Kentucky, have invented certain new and useful Improvements in Carriers for Eggs, Fruits, and the like, of which the following is a specification.

The object of my invention is to produce a highly efficient carrier for carrying eggs, fruit and the like which is simple in construction and cheap of manufacture.

I will describe the carrier as an egg carrying device, but it may be used for carrying any article.

This new carrier is made for carrying one or several dozen eggs, and can be packed in the usual egg crate, so that the eggs can be sold and delivered to the retail purchaser in packages containing a dozen or more eggs. The eggs can also be placed in these carriers from a bulk supply and delivered to the purchaser at the final sales place or they can be placed in the carriers by the farmer or original source of supply, or they may be sent by mail.

One of the salient features of my invention consists in providing a unique and specially constructed egg tray which is suspended so the eggs will be held in the suspended tray and also be cushioned, thus cutting the breakage of eggs to a minimum.

Another advantage consists in ventilating the carrier thoroughly and by peculiar construction.

Another feature consists in securely holding the egg tray in the body of the carrier and so combining the body and tray that the body portion will be held in a permanent position against displacement and lateral or endwise shifting.

Another feature of the carrier consists in providing slots or slits in the end walls of the egg pockets in the egg carrying tray so as to allow the pockets to hold eggs of varying sizes and contour, and this result is obtained by the eggs forcing the pockets to fit them when placed into said pockets.

My egg carrier is of unique construction and placed together so that it forms a structure which is braced from every point, thus retaining its original and normal position and form. Its various other features and advantages will readily become apparent from the following specification.

In the accompanying drawings forming part of the specification, Figure 1, is a plan view of the body of the carrier, before it has been formed into its proper contour, Fig. 2, is a plan view, broken in the middle, of the egg tray before it is folded and placed into the body portion, Fig. 3, is an isometric view of the carrier, closed, Fig. 4, is a cross section of the carrier taken at the line 4—4 of Fig. 3, Fig. 5, is an isometric view of the carrier closed and looking at it from the bottom, and Fig. 6, is an isometric view of the carrier, with one of the sides opened up and dropped down slightly, to illustrate construction and position of the parts.

The body of the egg carrier is composed of four semi-annular, elongated half tubes or sections, 1, 2, 3, 4, made from a sheet of card board or any suitable material.

The egg carrying tray 4' which fits into the body of the egg carrier is composed of a strip or strips of cardboard or the like, having central elongated eye shaped slots as 5, provided at each end with narrow elongated slots or slits as 20, and at intervals bent up and folded to form a double wall 6 of an inverted V-shape in contour; between these walls 6 are formed egg carrying pockets 7.

The egg carrying tray 4' is supported in the body of the carrier by reason of the slots 5 passing over the inner meeting edges 12 of the body parts 2 and 4, the slots 20 fitting into the recesses 11 in the meeting edges 12 of parts 2 and 4, so that said egg tray will be supported and suspended on said edges 12, an air space 13 being left at the bottom of the tray, between it and the body portions 2 and 3 so that the eggs will receive proper ventilation and also be cushioned by said air spaces. As before stated, at each end of the slots 5 I form a long thin recess or slit 20, which, when the egg carrying tray 4' is in the body portion, fit over the said meeting edges 12 of body parts 2 and 4 and thus, on account of their length and contour, lock the edges 12 together thus preventing lateral play or displacement of the said parts 2 and 4 and holding them tightly together, preventing the eggs from shifting.

The edges of the egg carrying tray 4', at each side, approximately opposite each egg pocket 7, are cut away as shown at 8, so that when the egg carrying tray is folded the pockets will be similarly formed at each side and appear narrowed at the bottom, thus allowing perfect ventilation for the contents of the carrier. Of course I may form the edges of the egg carrying tray in any other shape or contour to better retain the eggs in a fixed and cushioned position.

In the walls 6 on each side I cut egg or eye shaped slots as 9, two in each egg pocket 7, so as to permit the walls 6 to yield and give to the egg shape when said egg is placed in the pocket, thus eggs of varying sizes and shapes can be fitted into the egg carrying pockets 7 and ventilation is made more perfect. These slots may be made of any other shape and formed in any desirable manner and may be entirely dispensed with, if it be desired to give additional spring to the bottom of the egg pockets; as may be found desirable in carrying certain articles or products.

For the purposes of ventilation and proper candling of the eggs, I provide slots as 10, preferably semi-annular in contour, or may be of any other preferred shape or contour and are usually preferably cut in the bottom of the carrier at the inner meeting edges 12 of the body parts 2 and 3 at a suitable distance from the top of edges 12, one slot being cut in each side of the edge 12 so as to provide a slot for each pocket.

In the outer body portions 1 and 4 opposite each egg pocket 7, at a point near the inner meeting edge of the carrier body parts 1 and 2 and 3 and 4, I place elongated slots as 14 formed widest at the middle and narrowed at the edges so as to form means for allowing the light to enter over an extended space. These slots 10 and 14 are at the farthest points apart possible in the carrier on each side so that the entire egg can be properly candled.

It will be noticed (see particularly Fig. 4), that when the body and tray are together, the slots 10 in the body portions 2 and 4 are approximately opposite the cut away parts 8 on the egg carrying tray 4', thus a continuous air passage results from the outside to the inside of the carrier and also under the tray by reason of the space 13, so it will be observed the carrier is ventilated in a perfect manner. It is particularly desirable for shipping fruit when thus specially constructed.

A great desideratum in egg carriers is to hold or lock them in a closed position, so that they will not unfold, but remain in the normal packed position. This has been done by clasps, strings and other extraneous means, which are highly objectionable and readily get out of order and become untied, and in many cases, a folded flap is used which becomes loosened very readily. A great many eggs are broken because these egg carriers do not keep in the position in which they are intended to remain, and thus they become loosened and the eggs are broken. I overcome these objections by locking my egg carrier automatically, and when locked, it can only be opened by manual means. To accomplish this end, I provide the egg carrying tray 4' with slots 15, which slots have side recesses 21, in the present instance two on each side thereof, the slots 15 extending on each side of the recesses 21. When the egg tray is folded to form the egg pockets with the walls 6—6 the slots 15 and the recesses 21 are disposed similarly on each side of the top of the walls 6—6 of the egg pockets so they may form what might be termed double slots and double recesses. To further carry this locking device into effect I form at the lower edges of the folding halves 1 and 4 ribs or ridges 22, which ribs when the egg tray is suspended in the body portion are forced into the slots 15 and when said ribs reach the double recesses 21 they automatically pass into said recesses on account of the spring in the curvature of the half sections 1 and 4, and in this position the parts remain, as the ribs 22 can not leave the recesses as they are firmly held therein and locked against displacement of any kind, and the half sections 1 and 4 can not be opened except by manual means. The case will remain locked and in normal position under all conditions from the time of original packing until final delivery. This peculiar lock therefore, by holding the covering sections 1 and 4 in the thoroughly dependable position adds greatly as a preventive in breaking the eggs.

The holding of the meeting edges 12 of parts 2 and 4 together by reason of the elongated slots 20 locks the lower or bottom body parts and the locking done just described locks the upper halves 1 and 3, thus the whole carrier is locked together.

The locking of the lower halves 2 and 4 together and against displacement is an important feature of this invention as any flimsiness of the carrier is removed.

The egg pockets 7, by the peculiar formation of the parts forming them, support the eggs in a suspended position under which are air pockets, thus the eggs ride in safety and can be handled with less care, the breakage being consequently cut down to a minimum.

The egg carrier is very quickly packed and can readily be placed in the shipping crate to take the place of the usual "flats and fillers" now used, and can be handled with great convenience by the retailer and having a peculiar combined degree of stiffness and flexibility can be handled by the consumer with ease and pleasure and with satisfactory results.

The slots 11 in the edge 12 of the meeting edges of parts 2 and 4 into which the tray 4' fits by reason of slots 20 of the eyes 5 fitting down into the said slots 11 are all preferably of uniform shape except at each end in which instance they are slightly V-shaped so as to make a stronger construction at the ends of the carrier where it would naturally be weakest.

At each end of the outer half parts 1 and 3 I cut recesses as 30, to assist in holding the parts in position and to form a guide for closing the parts, the rib 22 extending between these edge slots or recesses 30.

The carrier can be used satisfactorily in the packing and shipment of fruit, as it is thoroughly ventilated and the fruit would not touch, each one being in an independent ventilated pocket. It may also be used for carrying candy or as a retail candy box—the pieces of candy do not come in contact.

While I have described and shown one specific form of egg carrier, it will readily be apparent that various modifications of the same can be made, without departing from the spirit or principle of the invention, and I wish to be understood that such modifications will fall within the scope of my invention.

What I claim as new and my invention and desire to secure by Letters Patent is:

1. In a carrier of the class described, a body portion made of a series of elongated half sections joined together, and capable of being folded together, a carrying tray, said carrying tray provided with a series of central slots, said slots at each end being narrowed into an elongated recess, which slots and recesses fit over, when the tray is folded, the meeting edges of the two middle halves enabling the tray to be suspended and supported in the body portion, the elongated recesses locking said two middle halves against displacement.

2. In a carrier of the class described, a body portion formed of a series of elongated half sections, a carrying tray, said carrying tray provided with central slots, said central slots at their ends carrying elongated recesses, said carrying tray suspended in said body portion, the slots and elongated recesses straddling the meeting edges of the inner halves, said elongated recesses locking the inner halves against displacement, the carrying tray when folded forming egg pockets, the end walls of said egg pockets provided with elongated slots enabling said pockets to accommodate eggs of varying sizes.

LOUIS A. DEGGINGER.

Witnesses:
H. E. CARSTENS,
GEO. H. RICKE.